June 2, 1959     E. FINKBEINER     2,889,401
INTERCOMMUNICATION UNIT
Filed Sept. 12, 1956     3 Sheets-Sheet 1
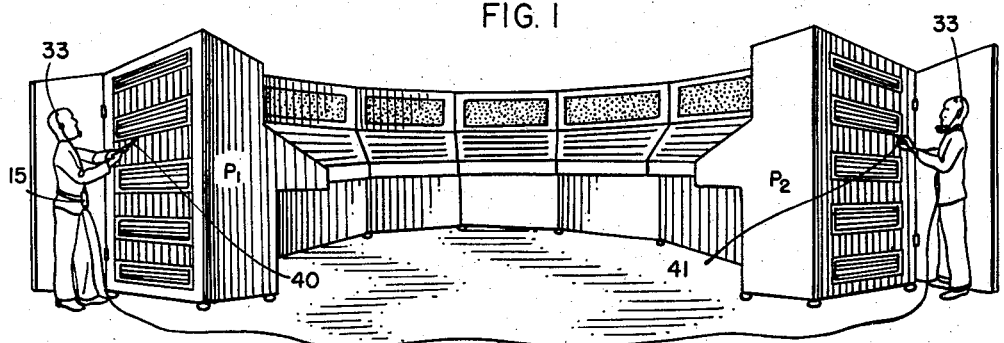
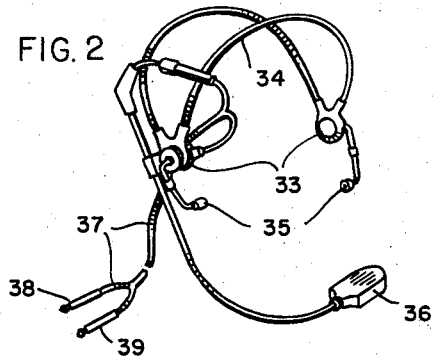
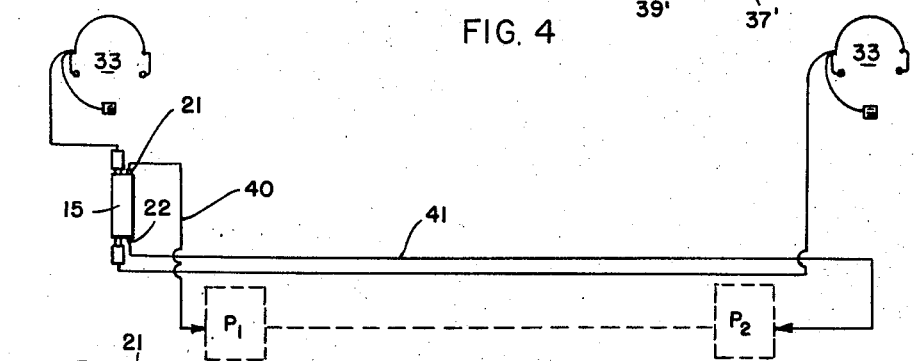
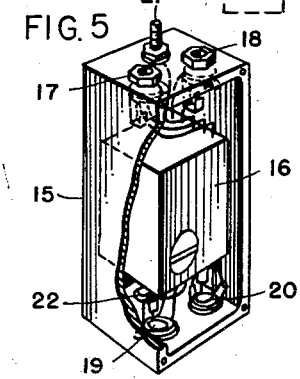
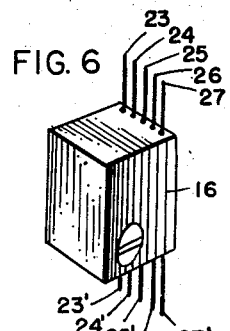
INVENTOR:
ERNEST FINKBEINER
BY
ATT'YS

INVENTOR:
ERNEST FINKBEINER
BY
ATT'YS

June 2, 1959  E. FINKBEINER  2,889,401
INTERCOMMUNICATION UNIT
Filed Sept. 12, 1956  3 Sheets-Sheet 3

INVENTOR:
ERNEST FINKBEINER
BY
ATT'YS

United States Patent Office 2,889,401
Patented June 2, 1959

2,889,401

INTERCOMMUNICATION UNIT

Ernest Finkbeiner, Chicago, Ill., assignor to Mid-West Coil and Transformer Corporation, a corporation of Delaware Application September 12, 1956, Serial No. 609,367

7 Claims. (Cl. 179—1)

In the installation and/or repair of complicated electrically-operated mechanisms, such as computers, telephone switchboards, missile and aircraft wirings, or other mechanisms, in the immediate environment of noise and confusion, the ready conversation between two persons presents a problem of considerable magnitude. Presently, two such persons can communicate with each other only by making an effort to so vocalize as to produce sounds sufficient to span the distance that separates them and/or exceed the noise created by other means.

For example, two men at the terminal panels of a large computor or an extensively arranged switchboard, using equipment presently available for testing circuits, have to depend upon shouting at each other. Should this be in a large room, or if there were any kind of din occurring, such shouting could easily create an excessive strain on their vocal chords. Moreover, there is a great probability of error in correctly understanding the shouted statements. Were there intervening partitions or walls, such shouting would be not at all practical.

As for another example, under conditions heretofore prevailing, two men, standing beside a large operating machine creating considerable noise, desiring to communicate with one another about aspects of the operation would have to shout into each other's ears. A most trying experience, especially if over an extended period of time.

The main objects of this invention, therefore, are to provide an improved form of electrical unit for use in two-way intercommunication systems to facilitate normal conversation between persons remotely placed to each other and/or in the presence of excessive noise; to provide an improved electrical unit for interposition between a pair of conventional two-way microphone-receiver head-sets; to provide an improved electrical unit of this kind for inclusion in a circuit-testing line and sounding a signal to both operators contemporaneously with their intercommunication; to provide an improved unit of this kind for use with either the conventional magnetic-type or carbon-type microphone-receiver head-set; and to provide an improved unit of this kind which is exceedingly small and compact in structure, very economical to manufacture, and exceptionally facile in use.

In the adaptation shown in the accompanying drawings:

Figure 1 is a miniature-size, perspective view of a computer for which two men are testing circuits and each man is equipped with a microphone-receiver head-set both connected to one electrical unit constructed in accordance with this invention.

Fig. 2 is a perspective view of a conventional microphone-receiver head-set for use with a pair of which this improved unit is especially adapted;

Fig. 3 is an enlarged, perspective view of the unit embodying this invention, the same being shown attached to the belt for one of the operators;

Fig. 4 is a diagrammatic view of the line connections by which a unit of this kind connects a pair of microphone-receiver head-sets and provides for conveying a tonal signal;

Fig. 5 is a perspective view of the unit with the housing cover removed and showing the positioning therein of the core-embedded operating circuit;

Fig. 6 is a perspective view of circuit-encapsulated core, for this improved unit, removed from its housing;

Figure 7:
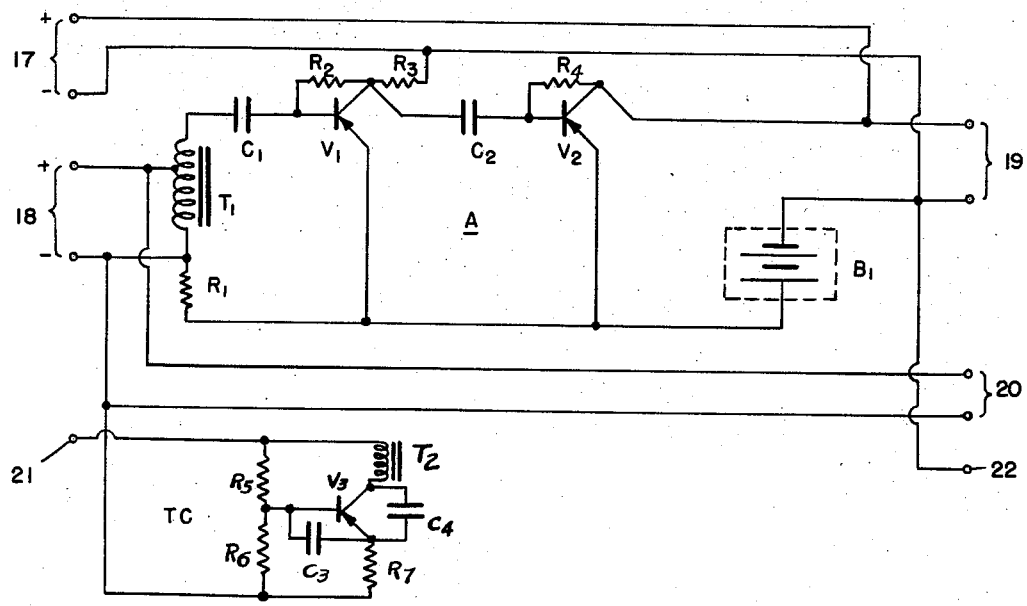
Fig. 7 is a diagram of the electrical circuit and incorporated devices which constitute this improved unit for use with magnetic-type microphone-receiver head-sets in connection with circuit testing.

The essential concept of this invention involves a housing, of relatively very small size, mounting pairs of microphone-receiver head-set jacks and a pair of third terminals and within which housing is enclosed a core-encapsulated electrically-connected miniature batteries, transformers, condensers, resistors, transistors, and external terminal wires the latter of which are connected to the respective jacks and the third terminals, when such terminals are used, and adapted for use with conventional microphone-receiver head-sets of either the magnetic or carbon type.

An intercommunication unit, embodying the foregoing concept, comprises a housing 15 and a circuit-encapsulated core 16, the housing 15 mounting the jacks 17, 18, 19, and 20—and the third terminal posts 21 and 22 when these are required—and the core 16 embedding the hereinafter described electrical circuits A, B, C, or D interposed between the terminal wires 23, 24, 25, 26, and 27 and 23', 24', 25', 26' and 27' connected to the jacks 17, 18, 19, and 20 and the terminal posts 21 and 22 respectively.

Figure 9:
Fig. 9 is a miniature perspective of a large milling machine with two men standing adjacent thereto and each equipped with microphone-receiver head-set connected to an electrical unit constructed in accordance with this invention.

When this improved unit is used for communication without a concurrent tonal signal—for example, as shown in Fig. 9—the terminal posts 21 and 22 would be omitted from the housing 15 and there would be two sets of only four terminal wires 23, 24, 25, and 26 and 23', 24', 25' and 26'.

The housing 15, as Figs. 1, 3, 5 and 9 clearly indicate, is a very small structure measuring approximately an inch and a half in transverse cross section and approximately from three and a quarter to four inches in length. Such a housing 15 can be molded from almost any non-conduction material. Conventional thermoset plastic or plastic-impregnated fabric materials have been found most suitable for this purpose. The one open side of the housing 15 is closed with a cover plate 28 held in place by suitable screws 29.

The housing 15 has a bracket 30 fixed on the back which is adapted to fit over the belt 31 of one of the operators (see Fig. 3) making use of this improved intercommunication unit in either of the manners herein illustrated in Figs. 1 and 9.

The core 16 also is a molded thermoset plastic wherein is embedded one of the hereinafter-described circuits A, B, C, or D interposed between the terminal wires 23, 24, 25, 26 and 27 and 23', 24', 25', 26' and 27' extending outwardly from the opposite ends of the core 16. Inwardly from the exposed face of the core 16 is one or two shallow wells for the reception of one or two batteries, each held in place by a screw 32.

The conventional microphone-receiver head-sets, for use with which this improved intercommunication unit had been especially designed, are of the general character shown in Fig. 2. Such a head-set comprises a pair of blocks 33 supported on a wire head-frame 34 and equipped with the usual ear plugs 35, a microphone 36, and a cable 37 (37') leading to a pair of plugs 38 and 39 (38' and 39'). As previously noted, the microphone 36 of such a head-set may be either of the magnetic type or the carbon type.

The jacks 17, 18, 19, and 20 of this improved unit and the plugs 38, 39 and 38' and 39' of the head-sets are of the well-known type embodying axially-spaced, insulated contacts which, when the plugs are set in the jacks complete circuits, affording the desired two-way communication.

When this improved unit is to be used for communication between two persons, the unit is worn by one person and the plug 38 and 39 on the head-set of such one person are set in the jacks 17 and 18 and the plugs 38' and 39', on the head-set worn by the other person, are set in the jacks 19 and 20. The length of the cable 37 need be only long enough for the plugs 38 and 39 to be conveniently set in the jacks 17 and 18. The length of the cable 37', for such other head-set plugs 38' and 39', however, will depend upon maximum distance which the two persons have to be apart to perform their circuit-checking function.

Where this improved intercommunication unit is used in connection with the testing of electrical circuits, each person has a line 40 or 41 attached to the terminal posts 21 and 22 respectively. The free ends of such lines terminate in exposed contact points. For the operator wearing the unit the line 40 is only two or three feet long. For the other operator, the line 41 has to lead back to the unit terminal 22 on the one operator. Such a line 41 is included in the cable 37' up to a point adjacent the plugs 38' and 39'.

The circuits A, B, C, and D, incorporating the interconnected electrical devices which constitute this improved intercommunication unit, are so formulated as to permit the use of the unit for the two different purposes hereinbefore indicated. One is to permit two persons to communicate with each other during the testing of electrical circuits (Fig. 1). The other is to permit two persons to communicate with each other when they are both standing beside a machine, the operation of which creates so much noise as to make practically impossible conversation otherwise (Fig. 9).

The circuits A and B are for use in the first of these above-noted purposes—i.e., circuit testing and conversing The circuits C and D are for use in the second of the above-noted purposes—i.e., merely intercommunication. The circuits A and C are for use with magnetic microphone-receiver head-sets, whereas the circuits B and D are for use with carbon microphone-receiver head-sets.

Figure 8:
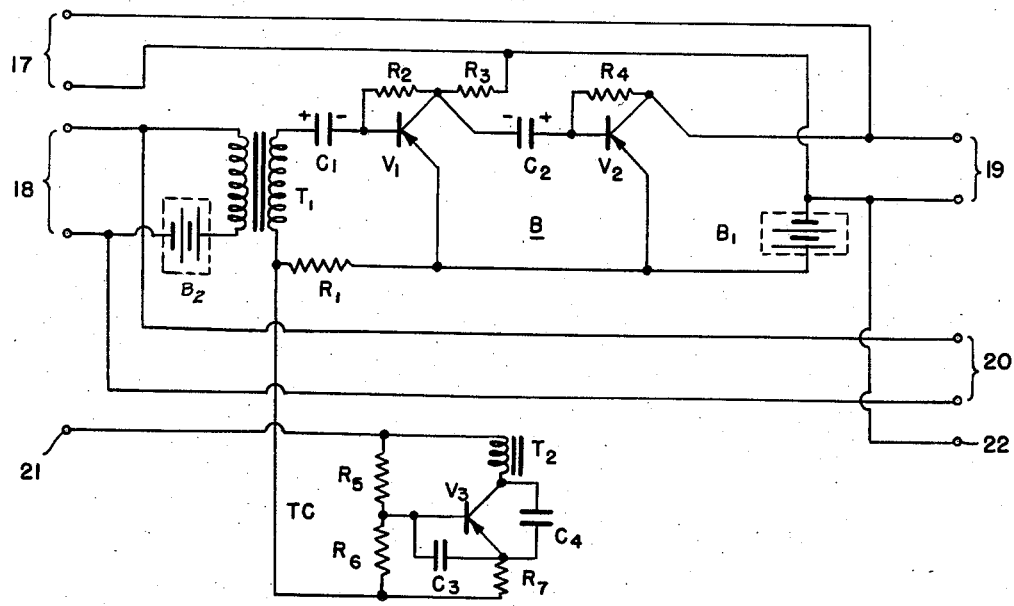
Fig. 8 is a similar view of the circuit and incorporated devices for use with a carbon-type microphone-receiver heat-set.
Figure 10:
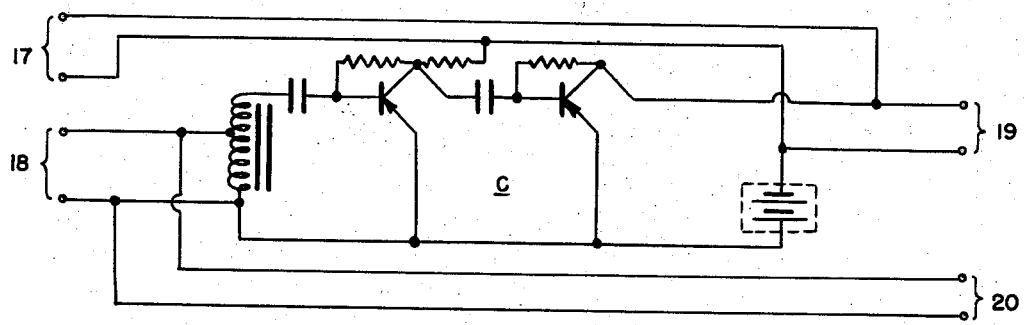
Fig. 10 is a diagram of the electrical circuit and incorporated devices which constitute this improved unit for use with magnetic-type microphone-receiver head-sets to permit intercommunication in noisy conditions without a concurrent tonal signal.
Figure 11:
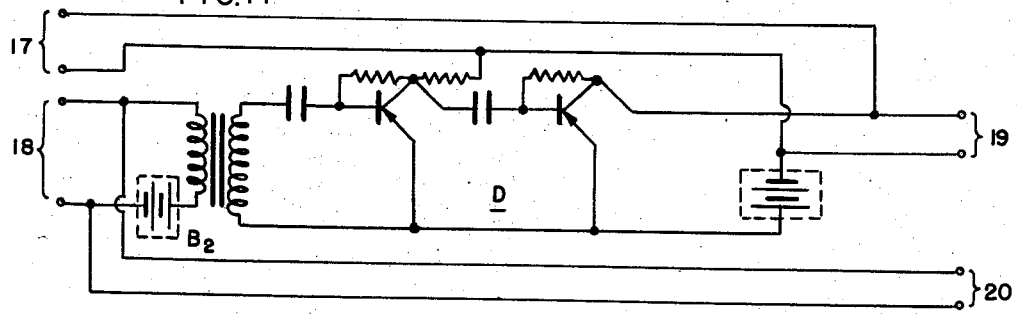
Fig. 11 is a similar diagram for use with a carbon-type microphone-receiver head-set.
Figure 12:
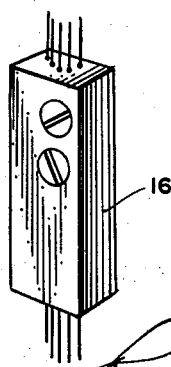
Fig. 12 is a perspective view of the improved unit core similar to that shown in Fig. 5 but embodying two batteries required for the circuit arrangement of Figs. 8 and 11.

With the magnetic microphone-receiver head-sets a single battery is required in the core 16 for the unit (Figs. 7 and 10), whereas with the carbon-microphone-receiver head-sets two batteries are required in the core 16 for the unit (Figs. 8 and 11).

Except for the use of one or two batteries, the circuits A and B are identical as are the circuits C and D. The circuits A and C are identical, as also are the circuits B and C except for the tonal circuit TC as indicated in the lower left of Figs. 7 and 8. This tonal circuit TC is required for producing an audio frequency through the testing lines 40 and 41 when the free-end contacts on these testing lines 40 and 41 complete a circuit between the panels P–1 and P–2.

The circuits A and C, for oral communication between two persons using magnetic microphone-receiver head-sets, each incorporates a battery $B_1$, a transformer $T_1$, resistors $R_1$, $R_2$, $R_3$, and $R_4$, condensers $C_1$ and $C_2$ and amplifying transistors $V_1$ and $V_2$ interposed in appropriate leads between the microphone jacks 18 and 20 and the receiver jacks 17 and 19.

The circuits B and D have these same above-noted electrical devices for circuits A and C except the transformer $T_1$ is of the requisite type for use with a second battery $B_2$ required to power the carbon type microphones. The second battery $B_2$ is interposed in one of the leads from the microphone jacks 18 and 20 and the transformer $T_1$.

Circuits A and B have the supplemental tonal circuit TC including a second transformer $T_2$, condensers $C_3$ and $C_4$, resistors $R_5$ and $R_6$, and an oscillating transistor $V_3$ interposed in the lead from the terminal post 21 to the lead from the microphone jacks 18 and 20 to the transformer T. The other terminal post 22 is connected by a lead to one side of the battery $B_1$.

This improved intercommunication unit is used in the following manner:

As shown in Fig. 3, the trouser belt 31 of one of the operators is threaded through the bracket 30 so that the unit is supported at the waist of that one operator.

Each of the two operators positions on his head a microphone-receiver head-set, such as shown in Fig. 2. The operator wearing the intercommunication unit sets the plugs 38 and 39, at the end of the cable 37, into the respective jacks 17 and 18 on the top end of the housing 15. The plugs 38' and 39', at the end of the other cable 37', are set in the jacks 19 and 20 in the lower end of the housing 15.

If the operators are to use this improved intercommunication unit in testing circuits, as shown in Fig. 1, the cable 37' extends along the floor between the two operators. The operators, each with his respective testing line 40 and 41 ready for use, may converse in a normal manner with each other about their respective actions at the panels $P_1$ and $P_2$. For example; the one operator would explain that he is positioning the contact point on his line 40 on a certain terminal on the panel $P_1$. The other operator at panel $P_2$ would position the contact point of his testing line 41 on what he assumed to be the corresponding opposite terminal.

If that is the correct opposite terminal, a circuit between the panel $P_1$ and panel $P_2$ is completed. The battery $B_1$ thereupon energizes the tonal circuit TC whereupon the oscillating transistor $V_3$ creates a series of impulses which are carried through and amplified by the communication circuit to the head-set receiver plugs of both operators. Thus they are informed that they have isolated the opposite terminals of a circuit through the mechanism which involves the two panels.

If the spotting of the contact point on the other operator's testing line 41 produces no sound, the operators know that either they have not contacted the opposite terminals of a particular circuit, or that the circuit is not complete otherwise.

In either case, whether there is the creation or absence of a sound, the two operators may quietly converse with each other as to their next step in their circuit testing of the machine.

When this improved unit is used for conversation in the environment of noisy machinery or other work, the two head-sets are connected, as above explained, to the unit worn by one of the operators. Thereupon they may converse with convenience in a normal manner.

I claim:
1. A two-way intercommunication unit for use by a pair of mobile operators comprising, a housing mounting two pairs of microphone-receiver jacks and a pair of tonal circuit terminals, a housing-enclosed core encapsulating a communication circuit and a tonal circuit, the communication circuit connecting the two pairs of jacks and including a battery, a transformer, a plurality of condensers, resistors, and amplifying transistors, the tonal circuit connecting the tonal-circuit terminals with the receiver jacks through the communication circuit and including an oscillating transistor to effect a tonal impulse in the communication circuit when the terminals are bridged and means for removably attaching the housing to the clothing of one of the operators.

2. A two-way intercommunication unit for use by a pair of mobile operators comprising, a housing mounting two pairs of microphone-receiver jacks and a pair of tonal circuit terminals, and a housing-enclosed core encapsulating a communication circuit and a tonal circuit, the communication circuit connecting the two pairs of jacks and including a battery, a transformer, a plurality of condensers, resistors, and amplifying transistors, the tonal circuit connecting the tonal-circuit terminals with the receiver jacks through the communication circuit and including a transformer, an oscillating transistor, and the requisite condensers and resistors, whereby the oscillating transistor effects a tonal impulse in the communication circuit when the terminals are bridged and means for removably attaching the housing to the clothing of one of the operators.

3. A two-way intercommunication unit for use by a pair of mobile operators comprising, an elongated rectangular-shaped housing, mounting on each end thereof a pair of microphone-receiver jacks, and a core encapsulating a communication circuit including a battery, a transformer, a plurality of condensers, resistors and amplifying transistors and connected to exposed terminal wires extending outwardly from the opposite ends of the core, the core being supported in the housing by having the exposed terminal wires bonded to the respective jacks at the adjacent ends of the housing and means for removably attaching the housing to the clothing of one of the operators.

4. A two-way intercommunication unit for use by a pair of mobile operators comprising, an elongated rectangular-shaped housing, mounting on each end thereof a pair of microphone-receiver jacks and a terminal post, and a core encapsulating a communication circuit and a tonal circuit connected to exposed terminal wires extending outwardly from the opposite ends of the core, the communication circuit including a battery, a transformer, a plurality of condensers, resistors, and amplifying transistors, the tonal circuit including a transformer, an oscillating transistor, and the requisite condensers and resistors to effect a tonal impulse in the communication circuit when the housing terminals are bridged, the core being supported in the housing by having the exposed terminal wires bonded to the respective pairs of jacks and terminal post at the ends of the housing and means for removably attaching the housing to the clothing of one of the operators.

5. A two-way intercommunication unit for use by a pair of mobile operators comprising, an elongated rectangular-shaped housing approximately one and one-half inches square in cross section and between three and one-half to four and one-half inches in length, the housing mounting on each end thereof a pair of microphone-receiver jacks, and a core of elongated rectangular form approximately one inch square in cross section and between one and one-half and three inches in length, the core encapsulating a communication circuit including a battery, a transformer, a plurality of condensers, resistors and amplifying transistors and connected to exposed terminal wires extending outwardly from the opposite ends of the core, the core being supported in the housing and having the exposed terminal wires bonded to the respective jacks at the adjacent ends of the housing and means for removably attaching the housing to the clothing of one of the operators.

6. A two-way intercommunication unit for use by a pair of mobile operators comprising, an elongated rectangular-shaped housing mounting on each end thereof a pair of microphone-receiver jacks, a core encapsulating a communication circuit including a battery, a transformer, a plurality of condensers, resistors and amplifying transistors and connected to exposed terminal wires extending outwardly from the opposite ends of the core, the core being supported in the housing by having the exposed terminal wires bonded to the respective jacks at the adjacent ends of the housing, and means on the housing adapted to permit attaching the unit to the clothing of an operator.

7. A two-way intercommunication unit for use by a pair of mobile operators comprising, an elongated rectangular-shaped housing approximately one and one-half inches square in cross section and between three and one-half and four and one-half inches in length, the housing mounting on each end thereof a pair of microphone-receiver jacks, a core of elongated rectangular form approximately one inch square in cross section and between one and one-half and three inches in length, the core encapsulating a communication circuit including a battery, a transformer, and a plurality of condensers, resistors and amplifying transistors and connected to exposed terminal wires extending outwardly from the opposite ends of the core, the core being supported in the housing by having the exposed terminal wires bonded to the respective jacks at the adjacent ends of the housing, and a bracket on the housing adapted to receive an operator's belt for supporting the unit in position for use.

References Cited in the file of this patent

UNITED STATES PATENTS

| | | |
|---|---|---|
| 1,760,920 | Stromberg | June 3, 1930 |
| 2,133,384 | Fisher et al. | Oct. 18, 1938 |
| 2,571,514 | Andrews | Oct. 16, 1951 |
| 2,659,772 | O'Hara | Nov. 17, 1953 |
| 2,691,073 | Lowman | Oct. 5, 1954 |
| 2,775,652 | Stutz | Dec. 25, 1956 |

OTHER REFERENCES

Potted Electronic Circuits by Harold E. Bryan, pp. 6A, 7A, 8A, 27A, "Radio and T.V. News," December 1950.